United States Patent [19]
Russell

[11] 3,757,265
[45] Sept. 4, 1973

[54] PROPORTIONAL CONTROLLER AND PARTS THEREFOR OR THE LIKE

[75] Inventor: William J. Russell, Malvern, Pa.

[73] Assignee: Robertshaw Controls Company, Richmond, Va.

[22] Filed: Mar. 22, 1972

[21] Appl. No.: 236,881

[52] U.S. Cl. .................................. 338/150, 338/41
[51] Int. Cl. ............................................. H01c 5/02
[58] Field of Search .................... 338/150, 151, 152, 338/165, 41, 91

[56] References Cited
UNITED STATES PATENTS

| | | | |
|---|---|---|---|
| 2,147,274 | 2/1939 | Taylor | 338/41 X |
| 2,909,062 | 10/1959 | Curtis et al. | 338/41 X |
| 3,585,561 | 6/1971 | Iversen | 338/150 |

*Primary Examiner*—Bernard A. Gilheany
*Assistant Examiner*—D. A. Tone
*Attorney*—Auzville Jackson, Jr. and James T. Candor

[57] ABSTRACT

A proportional controller having a potentiometer coil and a contact wiper movable across the coil from one longitudinal end thereof to the other longitudinal end thereof by a sensing device interconnected to the contact wiper and being adapted to move the contact wiper in relation to the condition being sensed thereby. Means are provided for adjusting the position of the potentiometer coil relative to the contact wiper in both a rotational direction and a straight line direction to produce a range change that is greater than when the potentiometer coil is just rotated about an axis passing transversely through the center of the longitudinal axis thereof.

10 Claims, 4 Drawing Figures

PROPORTIONAL CONTROLLER AND PARTS THEREFOR OR THE LIKE

This invention relates to an improved proportional controller as well as to improved parts for such a proportional controller or the like.

It is well known that proportional controllers have been provided wherein a measurement is provided by a potentiometer coil having a contact wiper movable across the same from one longitudinal end thereof to the other longitudinal end thereof by a sensing means interconnected to the wiper and being adapted to move the wiper in relation to the condition being sensed thereby.

For example, such proportional controllers and systems utilizing the same as fully described in Pages 71–74 of the book, Automatic Control of Heating and Air Conditioning, Second Edition, authored by John E. Haines and published by the McGraw-Hill Book Company in 1961.

It has been found according to the teachings of this invention that while such a proportional controller has been provided in the past with adjusting means for rotating the potentiometer coil about an axis passing transversely through the center of the longitudinal axis thereof so as to change the range provided by such controller in a manner hereinafter described, a much greater range change can be provided if the potentiometer coil is also provided with a transitional movement relative to the contact wiper.

Therefore, it is a feature of this invention to provide adjusting means for a proportional controller or the like wherein the adjusting means is adapted to adjust the position of the potentiometer coil relative to the contact wiper in such a manner that a range change can be provided that is greater than the range change when the potentiometer coil is first merely rotated about an axis passing transversely through the center of the longitudinal axis of the coil.

In particular, one embodiment of this invention provides a proportional controller having a potentiometer coil and a contact wiper movable across the coil from one longitudinal end thereof to the other by a sensing means interconnected to the contact wiper and adapted to move the contact wiper in relation to the condition being sensed thereby. An adjusting means is provided for adjusting the position of the potentiometer coil relative to the contact wiper by both simultaneously causing a rotational movement of the potentiometer coil relative to the contact wiper about an axis that passes transversely through the center of the longitudinal axis of the coil as well as causing a transitional movement of the potentiometer coil along a straight line that passes through the rotational axis of the potentiometer coil as well as the pivot axis of the contact wiper.

Therefore, it is an object of this invention to provide an improved proportional controller having one or more of the novel features set forth above or hereinafter shown or described.

Another object of this invention is to provide an improved method of operating a proportional controller or the like, the method of this invention having one or more of the novel features set forth above or hereinafter shown or described.

Other objects, uses and advantages of this invention are apparent from a reading of this description, which proceeds with reference to the accompanying drawings forming a part thereof and wherein.

Figure 1:
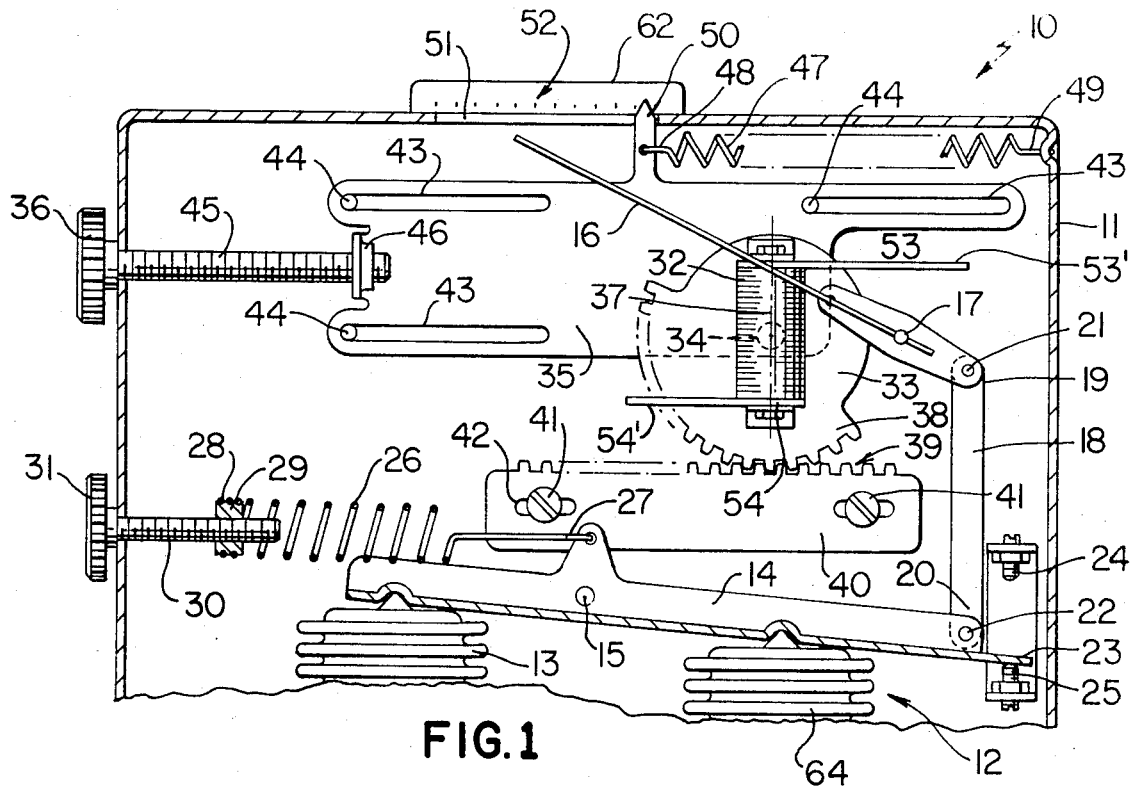
FIG. 1 is a fragmentary, cross-sectional view illustrating a proportional controller having the improved adjusting means of this invention.

While various features of this invention are hereinafter described and illustrated as being particularly adapted to provide a proportional controller, it is to be understood that the various features of this invention can be utilized singly or in any combination thereof to provide adjusting means for other devices as desired.

Therefore, this invention is not to be limited to only the embodiment illustrated in the drawings, because the drawings are merely utilized to illustrate one of the wide variety of uses of this invention.

Referring now to FIG. 1, the improved proportional controller of this invention is generally indicated by the reference numeral 10 and comprises a housing or support means 11 containing suitable condition responsive control means 12, which, in the embodiment illustrated, comprises a pair of expandable and contractible bellows constructions 13 and 64 being utilized for measuring a pressure differential in a conventional manner and translating such measurement into movement of a first lever 14 about its pivot point 15 which, in turn, translates such pivotal movement to pivotal movement of a contact wiper or arm 16 pivotally mounted to the housing 11 by its pivot pin 17 and interconnected to the lever 14 by an interconnecting link 18 pivoted respectively at its opposed ends 19 and 20 by pivot pins 21 and 22 to the right hand ends of the contact wiper arm 16 and the lever 14.

While the proportional controller 10 described and illustrated in the drawings measures pressure differential, it is to be understood that the condition sensing means 12 can be changed to be responsive to other types of conditions, as desired, such as temperature, humidity, etc., whereby this invention is not to be limited to any particular condition responsive means for causing movement of the contact wiper 16 as any type of lever system and sensing means can be provided for moving the contact wiper 16 in the housing means 11 of the controller 10 for reasons well known in the art.

Figure 2:
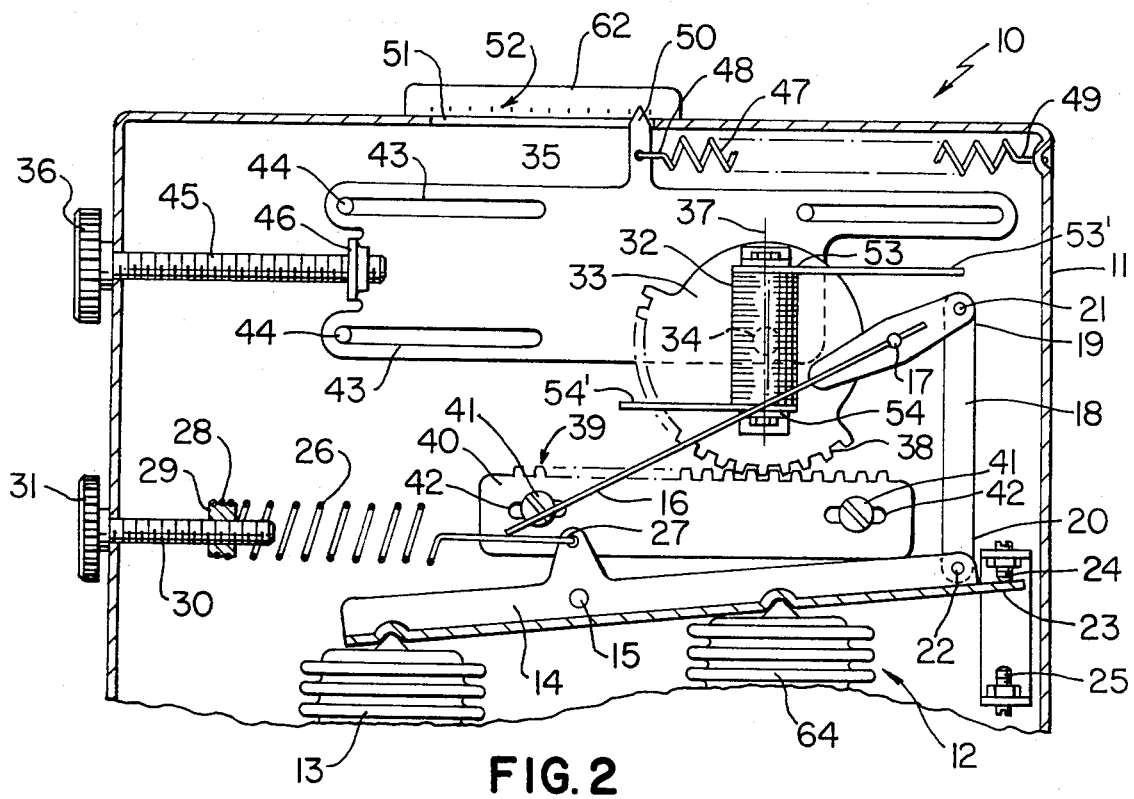
FIG. 2 is a view similar to FIG. 1 and illustrates the proportional controller in another operating condition thereof.

Nevertheless, it can be seen that the lever 14 has an end extension 23 movable between adjustable stop members 24 and 25 to limit the amount of movement of the lever 14 and, thus, pivotal movement of the contact wiper 16 between the two extreme positions illustrated respectively in FIGS. 1 and 2.

The lever 14 in the particular arrangement of the controller 10 illustrated in the drawings is normally urged to pivot in a counterclockwise direction by a tension spring 26 having one end 27 interconnected to the lever 14 and the other end 28 interconnected to a member 29 threaded on a threaded adjusting member 30 having a selector knob 31 exposed for selectively adjusting the force of the spring 26 and, thus, the set point adjustment for the controller 10 in a manner well known in the art.

A potentiometer coil 32 for the contact wiper 16 is fixed to a rotatable disc-like member 33 of this invention that is rotatably mounted by a shaft means 34 to a movable guide member 35 that is adapted to be adjusted relative to the frame or housing means 11 by a selector knob 36 in a manner hereinafter described. However, it can be seen that the axis of the shaft 34 for the rotatable member 33 passes transversely through the center of the longitudinal axis 37 of the potentiometer coil 32 so that when the member 33 is rotated on the axis 37, the potentiometer coil 32 will be rotated relative to the contact wiper 16 about an axis passing transversely through the center of the longitudinal axis 37 of the coil 32 for the purpose hereinafter described.

The rotatable member 33 has a geared tooth portion or sector 38 that is adapted to be disposed in meshing relation with rack-like gear teeth 39 disposed in a straight line path on a gear member 40 fixed to the housing 11, but made adjustable relative thereto by fastening members 41 passing through elongated slot means 42 in the rack member 40 and attaching to the frame or housing 11.

Figure 3:
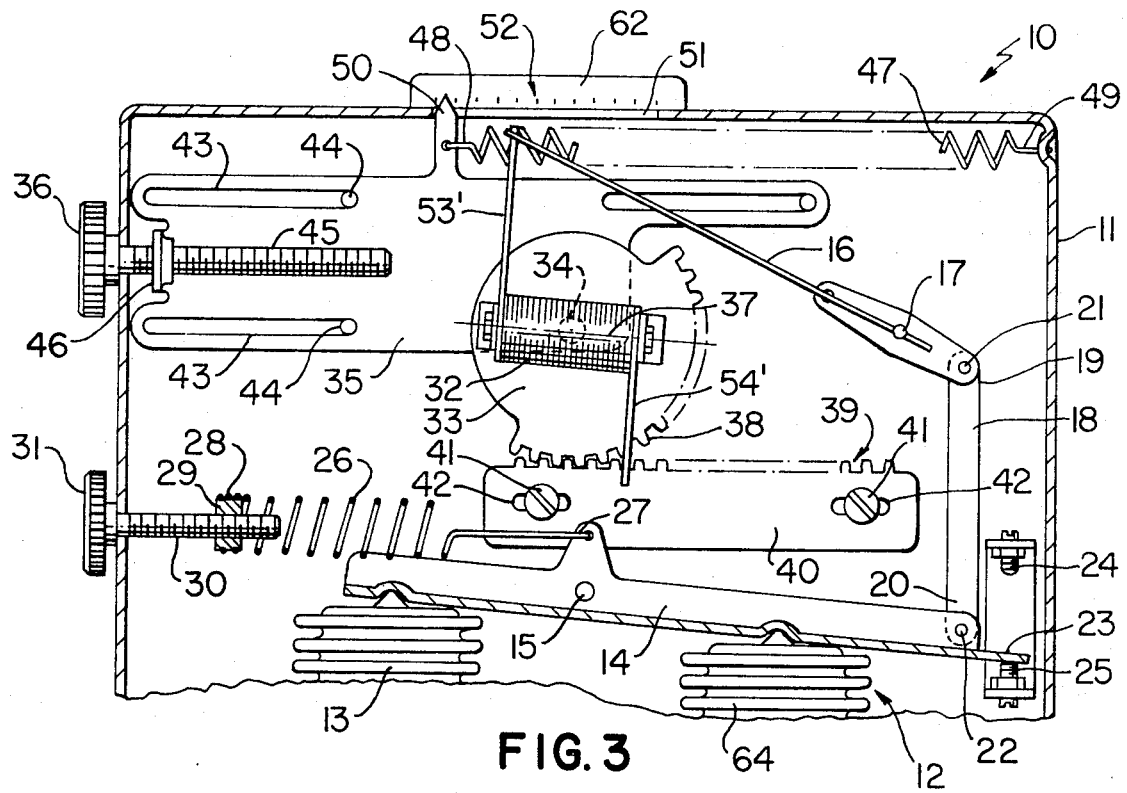
FIG. 3 is a view similar to FIG. 1 and illustrates the potentiometer coil thereof having been adjusted to another operating position thereof.

The guide member 35 is movable relative to the housing 11 and has a plurality of elongated slots 43 provided therethrough and respectively receiving guide pins 44 carried by the housing 11 and permitting the guide member 35 to be moved from the position illustrated in FIGS. 1 and 2 to the position illustrated in FIG. 3 by the selector knob 36 being rotated in a desired direction to cause a threaded shaft 45 thereof to effect a thread in or a thread out of a threaded member 46 carried by the guide member 35 as illustrated and threaded on the shaft 45.

The guide member 35 is normally maintained in its rightward position as illustrated in FIG. 1, wherein the guide rods 44 prevent further movement of the guide member 35 to the right, by a tension spring 47 having one end 48 thereof interconnected to the guide member 35 and the other end 49 thereof interconnected to the housing means 11. However, the adjusting member 36 can move the guide member 35 to the left in opposition to the force of the tension spring 47 to position the guide member 35 in any selected position relative to the housing 11 within the limits of the guide pins 44 in the guide slots 43 between the two extreme positions illustrated in FIG. 1 and FIG. 3 for the purpose hereinafter described. If desired, the guide member 35 can contain a pointer-like part 50 that projects out through a slot 51 in the housing 11 to register against a scale 62 on a housing part 52 to indicate the particular adjusted position of the guide member 35 relative to the housing 11 and, thus, indicate the particular range being provided by the controller 10 for the particular adjusted position of the guide member 35, as will be apparent hereinafter.

From the above, it can be seen that the adjusting means 36, 45, 35, 33 and 40 for the potentiometer coil 32 of this invention can be provided by relatively few parts in a simple and effective manner to cause adjusting of the range of the controller 10 in a manner now to be described.

With the selector knob 36 disposed in the position illustrated in FIGS. 1 and 2, it can be seen that the sensing means 12 for the controller 10 can cause the contact wiper or arm 16 to move from one longitudinal end 53 of the potentiometer coil 32 to the other longitudinal end 54 thereof as limited by the stops 25 and 24 with the position of the longitudinal axis 37 of the coil 32 being to the extreme right-hand position by the guide member 35 so that one increment of movement of the lever means 14 and 18 by the sensing means 12 will cause two increments of movement of the wiper arm 16 along the longitudinal axis 37 of the coil 32 for the minimum ratio of two to one for the particular lever arm arrangement illustrated merely for example purposes.

It is well known that proportional controllers utilize the unbalance of signals being generated at the potentiometer 32 when the wiper 16 is not at the exact middle thereof to tend to cause a control device to effect its output to produce the desired output as set by the set point adjustor knob 31 whereby the details of operation of the coil 32 and the controller 10 need not be further described.

In the embodiment illustrated in the drawings, the contact wiper 16 of the controller 10 is adapted to move from the extreme position illustrated in FIG. 1 to the extreme position illustrated in FIG. 2 by moving through an arc of approximately 52-½° to effect movement from end 53 of the coil 32 to the other end 54 thereof for covering the complete range of control provided by the coil 32 when the same is in the right-hand position of FIGS. 1 and 2.

As previously stated, proportional controllers have been provided wherein the potentiometer coil 32 has been adapted to be rotated on an axis passing transversely through the center of the longitudinal axis thereof so that when the same is rotated about such fixed axis, through an arc of approximately 86 degrees, then the contact wiper 16 for such potentiometer coil 32 need only move through an arc approximately 1.75° to completely move from one longitudinal end 53 of the coil 32 to another longitudinal end 54 thereof so that a rate change will be provided in such manner that one increment of movement of the lever means 14, 18 by the sensing means 12 will produce the equivalent of 30 increments of movement of the contact wiper 16 on the coil 32 as contrasted with a two to one ratio when the coil 32 is in the vertical position illustrated in FIG. 1. Thus, an increased sensitivity will be provided when the coil 32 is rotated from its vertical position to its near horizontal position.

However, as previously stated, one of the features of this invention is to provide means for adjusting the controller 10 in such a manner that the same can have a rate change greater than when the potentiometer coil is just merely rotated about an axis passing transversely through the center of the longitudinal axis thereof so that the adjusting means of this invention will provide a more sensitive controller than prior known controllers of the same general type.

For example, when a person adjusts the knob 36 of the controller 10 of this invention to cause the threaded shaft 45 to rotate in a direction to cause the threaded member 46 to move axially thereon from right to left in the drawings, between the position illustrated in FIG. 1 to the position illustrated in FIG. 3, the axial movement of the guide member 35 from right to left along a path parallel to the straight line path of the rack gear teeth 39 carries the rotational axis 34 for the rotatable member 33 therewith so that the shaft 34 axially moves or translates in a straight-line direction to the left parallel to the gear teeth 39 on the rack member 40 with the rack member 40 causing the rotatable member 33 to rotate relative thereto through the intermeshing relation of the teeth 39 with the gear teeth 38 whereby when the guide member 35 reaches the extreme lefthand position illustrated in FIG. 3, the rotatable member 33 has caused the potentiometer coil 32 to not only rotate through an 86 degree arc, as illustrated, but also to have translated in a straight-line path away from the pivot point 17 of the contact wiper 16 with such straight-line translation path passing through the pivot point 17 of the contact wiper 16 as well as the rotational axis 34 for the potentiometer coil 32.

Thus, it can be seen that not only has the potentiometer coil 32 been rotated through an arc of 86° about its axis by the rotatable member 33 so as to produce a rate change of 30 to one in the manner previously described for just the rotational movement of the coil 32 relative to the contact wiper arm 16, but also because the transverse axis 37 for the coil 32 has been translated along a straight line or path away from the pivot point 17 of the contact wiper 16, such translational movement of the coil 32 has also caused an increment change relative to the levers 14, 18 to produce a five to one lever ratio as opposed to the two to one lever ratio provided when the coil 32 is in its extreme right-hand position of FIG. 1. In this manner, a net gain of three to one is provided in the lever ratio change between the extreme coil positions of FIGS. 1 and 3. Thus, the total rate change now provided is ninety to one whereby it can be seen that more sensitive controller 10 is provided when the potentiometer coil 32 is moved to the extreme lefthand position as illustrated in FIG. 3 as opposed to when the coil 32 is disposed to the extreme right-hand position illustrated in FIG. 1 and merely rotated in this right-hand position as in the past.

Figure 4:
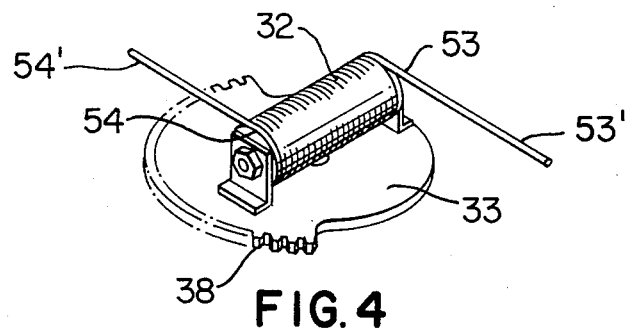
FIG. 4 is a perspective view of the potentiometer coil of the proportional controller of FIG. 1 rotatably mounted to the member carrying the same.

In order to maintain the contact wiper 16 in electrical contact with the coil 32, as well as in proper registry with the potentiometer coil 32 when the coil 32 is rotated by the rotatable member 33 from the position illustrated in FIG. 1 to the position illustrated in FIG. 3, electrically conductive arm extensions 53' and 54' of small electrical resistance can be provided at the longitudinal ends 53 and 54 of the coil 32 as illustrated in FIG. 4 to be in electrical contact with the ends 53 and 54 of the coil 32 and permit the contact wiper 16 to move to its extreme up and down positions as permitted by the stops 24 and 25 even though the wiper 16 is not actually contacting the coil 32 at that particular time. Thus, arms 53' and 54' become part of the electrical circuit through the coil 32 when the contact wiper 16 moves out beyond the coil 32.

Thus, it can be seen that this invention not only provides an improved proportional controller, but also this invention provides an improved method of operating such a proportional controller or the like.

While the form of the invention now preferred has been described as required by the Patent Statute, other forms may be utilized all coming within the scope of the appended claims.

What is claimed is:

1. A proportional controller comprising support means, a potentiometer coil carried by said support means, a contact wiper carried by said support means and being movable across said coil from one longitudinal end thereof to the other longitudinal end thereof, sensing means carried by said support means and being interconnected to said wiper so as to be adapted to move said wiper in relation to the condition being sensed thereby, and adjusting means carried by said support means and being operatively interconnected to said potentiometer coil for adjusting the position of said potentiometer coil relative to said contact wiper in such manner that a range change can be provided that is greater than when the potentiometer coil is merely rotated about an axis passing transversely through the center of the longitudinal axis of said coil.

2. A proportional controller comprising support means, a potentiometer coil carried by said support means, a contact wiper carried by said support means and being movable across said coil from one longitudinal end thereof to the other longitudinal end thereof, sensing means carried by said support means and being interconnected to said wiper so as to be adapted to move said wiper in relation to the condition being sensed thereby, and adjusting means carried by said support means and being operatively interconnected to said potentiometer coil for adjusting the position of said potentiometer coil relative to said contact wiper, said adjusting means being adapted to cause rotational movement of said potentiometer coil relative to said contact wiper as well as to cause translational movement of said potentiometer coil relative to said contact wiper.

3. A proportional controller as set forth in claim 2 wherein said translational movement of said potentiometer coil takes place simultaneously with said rotational movement thereof.

4. A proportional controller as set forth in claim 2 wherein said translational movement of said potentiometer coil is along a straight line.

5. A proportional controller as set forth in claim 4 wherein said contact wiper pivots about a point and wherein said straight line passes through said point.

6. A proportional controller as set forth in claim 2 wherein a member is rotatably mounted to said support means and has said coil fixed thereto whereby said member is adapted to rotate said potentiometer coil about an axis passing transversely through the center of the longitudinal axis of said coil.

7. A proportional controller as set forth in claim 6 wherein said rotatably mounted member has a gear tooth portion, a gear member carried by said support means and disposed in mesh with said gear portion of said rotatable member whereby rotation of said rotatable member causes said rotatable member to translate along said gear member.

8. A proportional controller as set forth in claim 7 wherein said gear member has the gear teeth thereof disposed in a linear path.

9. A proportional controller as set forth in claim 8 wherein a guide member is carried by said support means and is movable along a path parallel to said linear path, said rotatable member being rotatably mounted to said guide member.

10. A proportional controller as set forth in claim 9 wherein means is operatively interconnected to said guide member to tend to maintain the same in one position thereon on said path thereof, said controller having selector means operatively interconnected to said guide member to position the same in a selected position on said path thereof in opposition to said means tending to maintain said guide member in said one position thereof.

* * * * *